(12) United States Patent
Calderon et al.

(10) Patent No.: US 8,557,014 B2
(45) Date of Patent: Oct. 15, 2013

(54) METHOD FOR MAKING LIQUID IRON AND STEEL

(76) Inventors: Albert Calderon, Bowling Green, OH (US); Terry James Laubis, Portage, OH (US); Richard Owen McCarthy, Strongsville, OH (US)

( * ) Notice: Subject to any disclaimer, the term of this patent is extended or adjusted under 35 U.S.C. 154(b) by 286 days.

(21) Appl. No.: 12/931,277

(22) Filed: Jan. 28, 2011

(65) Prior Publication Data
US 2012/0192677 A1   Aug. 2, 2012

(51) Int. Cl.
*C21B 13/14* (2006.01)
*C21B 11/10* (2006.01)
*C21B 13/12* (2006.01)
*C21C 7/10* (2006.01)

(52) U.S. Cl.
USPC ............. 75/10.15; 75/10.66; 75/503; 75/508; 75/524

(58) Field of Classification Search
USPC ........... 75/504, 569, 524, 10.15, 10.17, 10.66
See application file for complete search history.

(56) References Cited

U.S. PATENT DOCUMENTS 6,214,085 B1 *   4/2001   Calderon et al. ................. 75/486
6,409,790 B1 *   6/2002   Calderon et al. ............. 75/10.12

OTHER PUBLICATIONS

Mishra, B. "Steelmaking Practices and Their Influence on Properties." ASM Handbooks Online. ASM International, 2002. Web. Feb. 28, 2013. <http://products.asminternational.org/hbk/index.jsp>.*

* cited by examiner

*Primary Examiner* — George Wyszomierski
*Assistant Examiner* — Tima M McGuthry Banks (57) ABSTRACT

A carbonaceous-based metallizing method and apparatus wherein a metallic oxide is converted into a carbon-containing, metallized intermediate that is melted in an induction channel furnace to produce liquid metal from said metallic oxide. In the application of iron ore in the form of fines or concentrate, using low-cost coal will greatly reduce capital and operating costs by virtue of eliminating agglomeration of ore, cokemaking, and blast furnace operation. The liquid iron so produced is efficiently converted into steel in a steelmaking furnace such as a basic oxygen furnace (BOF), especially when it is physically integrated to the induction channel furnace wherein the liquid iron is directly poured into the integrated BOF by the induction channel furnace, producing low-cost steel, little heat loss, and minimum emissions.

23 Claims, 9 Drawing Sheets

FRONT ELEVATION OF OVERALL PLANT
VIEWED FROM A DISTANCE

DIRECT MAKING OF LIQUID IRON FROM
IRON ORE FINES (OR CONCENTRATE) AND LOW COST COAL

FIG. 1

FRONT ELEVATION OF OVERALL PLANT
VIEWED FROM A DISTANCE

DIRECT MAKING OF LIQUID IRON FROM
IRON ORE FINES (OR CONCENTRATE) AND LOW COST COAL

CLOSE UP OF ACCEPTABLE METALLIZED IRON INTERMEDIATE WITH CARBON INTERSPERSED IN THE IRON

FIG. 3

BATTERY OF METALLIZING REACTORS FOR PRODUCING IRON/CARBON INTERMEDIATE

INTEGRATION OF STEELMAKING FURNACE TO IRON MELTING FURNACE

METHOD FOR MAKING LIQUID IRON AND STEEL

INTRODUCTION

The present invention relates to the making of iron and steel and is an improvement over Applicant's U.S. Pat. No. 6,409,790 B1, issued on Jun. 25, 2002, hereinafter referred to as the "referenced patent."

This referenced patent discloses a method and apparatus for practicing carbonaceous-based metallurgy, and in the specific case of making liquid iron, two distinct steps are involved. The first step comprises the formation of an iron/carbon product in a horizontal tubular reactor wherein a gas containing oxygen is injected from a horizontal lance inserted from the discharge end of the horizontal reactor while the hot iron/carbon product (intermediate) formed is discharged into a vertical reactor. The second step comprises the melting of the iron/carbon product in the vertical reactor, called a "melter/homogenizer," by means of the injection of a gas containing oxygen using a vertical lance to convert iron/carbon product into liquid iron which is fed into a holding reservoir. Specifically, the instant invention relates to improvements made to the referenced patent as it relates to the making of liquid iron comparable to liquid iron produced in a blast furnace, which is commonly known in the steel industry as "Hot Metal."

BACKGROUND

The steel industry in March 1998 issued a comprehensive publication entitled "Steel Industry Technology Roadmap," and on page 11, it states the following:

> The ultimate objective in the iron smelting area is to develop a coal-based process that produces liquid iron directly from coal and ore fines or concentrate. Liquid iron is preferred to solid iron because there is no gangue and it retains its sensible heat. Coal is obviously preferred over coke or natural gas because of its abundance and lower cost. If possible, the use of fines or concentrate will eliminate agglomeration costs. These new processes should have a high smelting intensity or productivity. High productivity and the elimination of coke-making and agglomeration will significantly reduce capital costs.

In substance, the Roadmap's ultimate objective was, and still is, to substitute several plants, shown within the blue enclosure of Exhibit 1, with one single efficient plant. The Applicant conceived the subject matter disclosed in the reference patent as a solution to the ultimate objective of producing liquid iron directly wherein coal and ore fines or concentrate are used; a patent application was filed, and the reference patent was issued.

To put the concept into practice, a pilot was constructed (Exhibit 2) and tests were initiated. A multitude of problems were discovered. The most serious problems consisted of the following:

No 1. Sporadic explosions caused by super-heated steam generated from water leakage from the melt-down of the stainless steel outer tube (sheath) at the copper tip of the water-cooled, oxygen injection lance (Exhibit 3), which endangered operating personnel, one of whom experienced severe burns, necessitating a hospital stay. To prevent the melting of the stainless sheath, steps were taken to increase the size of the copper tip. Unfortunately, excessive build-up at the tip of the lance occurred (Exhibit 4), resulting in destroying the flow pattern of the oxygen.

No 2. The uniform flow of the gas containing oxygen from the tip of the lance is most critical in order to produce a uniform product, an iron/carbon intermediate of some 50% metallization with about 6% carbon is suitable for conversion into carbon-saturated liquid iron of blast furnace specification. The problems caused by the build-up at the tip of the lance included premature melting, over-oxidation, too low in metallization, and completely unreduced feed material:

No 3. Excessive heat loss occurred within the horizontal reactor, especially toward its discharge end, caused by the cooling effect from the water-cooled lance.

No 4. Build-up at the discharge end of the horizontal reactor itself persisted (Exhibit 5), resulting in a physical blockage that prevented the advancement of the contents of the horizontal reactor by means of the pushing ram of the charger, thus forcing unscheduled shutdowns.

No 5. Build-up downstream of the horizontal metalizing reactor and upstream of the storage was also experienced in the vertical section where the homogenizer/melter would be located, causing shutdowns that entailed moving equipment to provide access to poke hot, built-up material with a bar to unplug the build-up; Exhibit 6.

No 6. Iron/carbon intermediate that was fed to the melting furnace, being lighter than the liquid iron, would float on top of the molten bath (Exhibit 7) and dwell there, instead of entering into solution with the metal in the molten bath, such flotation of intermediate preventing the rapid and complete conversion of the intermediate into liquid iron.

In addressing problems No 1, No 2, and No 3, it was decided to relocate the injection lance to be introduced from the cold end through the charger of the horizontal metalizing reactor, as shown in Exhibit 8, together with increasing the pressure of injection of the gas containing the oxygen to create a forceful jet from the tip of the lance to reach all the way to the discharge end of the horizontal metalizing reactor, with the tip of the lance being located where the temperature of the iron ore and ash are below their incipient fusion. This required the construction of a new charger (Exhibit 9), wherein a provision was made for the lance to pass through the center of the mandrel, resulting in a structure of the lance being disposed through the mandrel and the mandrel through the pushing ram.

In addressing problem No 4, which relates to the blockage created by build-up at the discharge end of the metallizing reactor, the new charger was constructed structurally more robust than the initial one, and also the hydraulic pressure was raised by adding a booster hydraulic pump with new controls (Exhibits 10A and 10B) to increase the pushing force of the new charger in order to surmount blockage.

In addressing problem No 5, to prevent build-up downstream of the metalizing reactor and upstream of the storage, it was decided to completely eliminate the homogenizer/melter (numeral 11), described in the referenced patent, and perform the melting of the iron/carbon intermediate in an induction channel furnace (ICE) as that made by Ajax Magnethermic, with certain modifications as would be described in detail hereinafter, to serve both as a melter as well as storage of liquid iron.

In addressing the issue of the intermediate flotation on top of the molten bath, a vertically oscillating mechanical dunker was developed (Exhibit 11A) which was equipped with a graphitic block (Exhibit 11B) which is adapted to force the floating intermediate to be submerged below the level of the high-temperature bath where the carbon in the intermediate completes the reduction of the unreacted oxides of iron, namely, $Fe_2O_3$, $Fe_3O_4$, and $FeO$, which have not reacted in the horizontal metallizing reactor.

With the changes made, the Applicant was successful in overcoming the problems mentioned hereinbefore and producing an acceptable intermediate into which carbon from the coal is integrally imbedded within the metallized iron made from ore fines or concentrate in the horizontal metalizing reactor (Exhibit 12).

Further, two valuable gases are co-produced: one during the metallization of the iron ore in the horizontal metallizing reactor and a second during the melting of the intermediate (Exhibit 13).

To summarize the above, the Applicant, in effect, has invented a method and apparatus adapted to accept various proportions of ore and coal and yet produce a liquid iron (Exhibit 13) by way of producing an intermediate whose composition is quite suitable to be converted to liquid iron that can be subsequently converted into low-cost steel.

OBJECTIVE OF THE INVENTION

The main object of this invention is to produce liquid iron directly from ore fines and concentrate using low-cost coal consistent with the Ultimate Objective stated in the *Steel Industry Technology Roadmap* of March 1998, mentioned above.

Another object of the present invention is to provide an efficient method and apparatus to carry out same for converting an iron ore and coal mix into liquid iron at an efficiency greater than the conventional process of making liquid iron in a blast furnace that uses coke and iron ore pellets.

Therefore another object of the instant invention is to provide a method and apparatus that greatly reduce heat loss when compared with the conventional process of making liquid iron in a blast furnace that uses coke and iron ore pellets.

Still another object of the instant invention is to provide a method and apparatus that greatly reduce emissions when compared to conventional processes that feed pellets, sinter, and coke into a blast furnace, which in turn is a major emitter of carbon dioxide ($CO_2$).

Further another object of the present invention is making an induction channel furnace (ICF) more efficient while still protecting its lining by providing dunking means which assist in submerging an iron/carbon intermediate into the molten iron bath in the ICF in order to expedite its reaction and cause it to blend with the constituents in the molten iron bath to result in its rapid liquifaction and assimilation within the molten iron bath.

Further still another object of the present invention is to physically integrate an induction channel furnace (ICF) to a steelmaking furnace, such as to a basic oxygen steelmaking furnace or to an electric arc steelmaking furnace, known in the industry as BOF and EAF, respectively, but by way of example, the description that follows will disclose the integration of the ICF to the BOF, the ICF being adapted to convert an iron and carbon intermediate into molten iron while the BOF converts molten iron and scrap into steel. The ICF and the BOF are joined together structurally in such a way as to result in a hybrid, dual-purpose configuration that reduces capital and operating costs, increases efficiency, and minimizes emissions.

Further yet another object of the present invention consists in providing a physical interconnection between the ICF and the BOF to enable the direct pouring of molten iron directly from said ICF in said BOF by revolving both said ICF and said BOF radially without necessitating the use of a crane.

It is still another object of the present invention to provide an ICF per se in the case of making molten iron only in situations where an improved method of iron making is required without the production of steel.

It is therefore another object of the present invention to provide a method and apparatus that can convert carbon dioxide ($CO_2$), a greenhouse gas, into a useful product such as fertilizer.

Other objects of this invention will appear from the following description and appended claims. Reference is made to the accompanying drawings which describe certain apparatus structures to practice this method of making an iron/carbon intermediate which is converted to liquid iron, which is subsequently converted into steel. It is to be understood that the method and apparatus disclosed herein are not limited solely to the processing of iron-bearing ore, as the invention can also be applied to other non-iron bearing ores.

Before describing in detail the present invention, it is to be understood that this invention is not limited to the details or arrangement of the parts illustrated in the attached drawings, as the invention can be operative by using other embodiments. Also, it is to be understood that the terminology herein contained is for the purpose of description and not limitation.

DETAILED DESCRIPTION OF THE DRAWINGS

Figure 1:
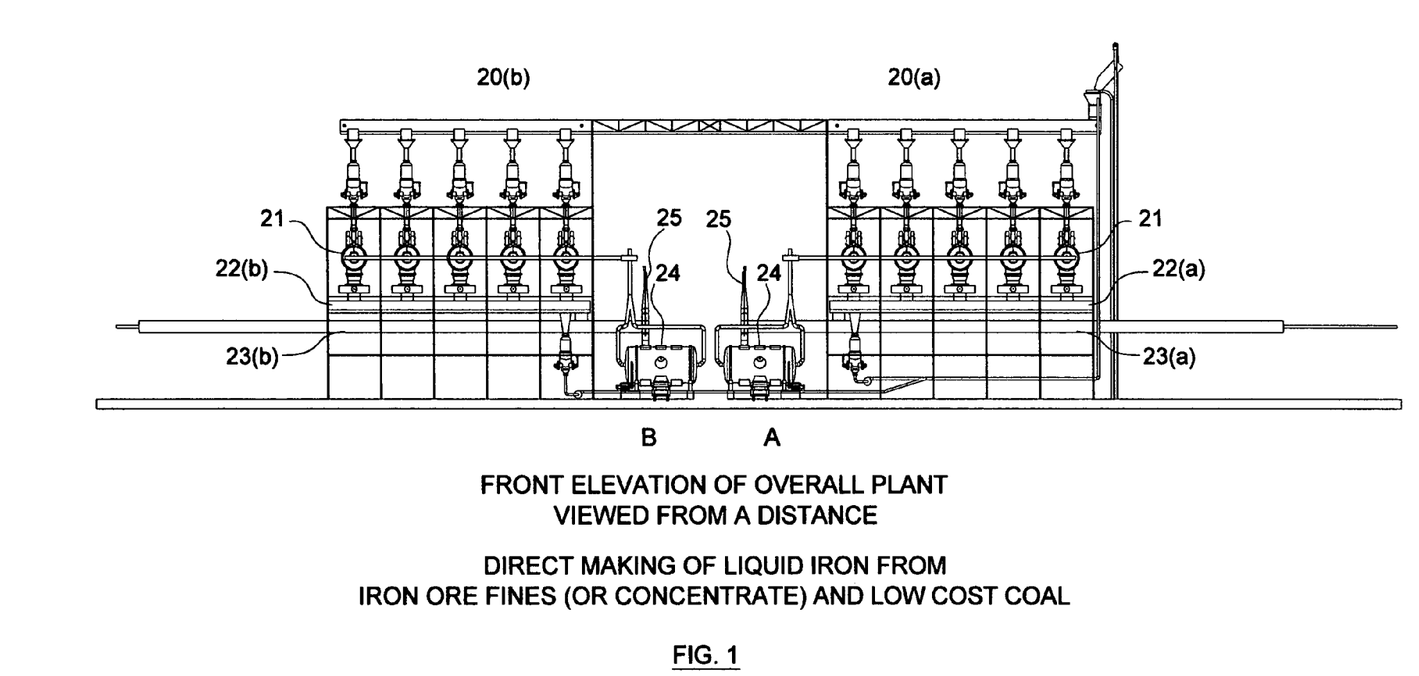
FIG. 1 illustrates the plant to directly make liquid iron from coal and ore fines or concentrate.

FIG. 1 illustrates conceptually a plant consisting of two batteries, marked 20(*a*) and 20(*b*), with each comprising several identical metalizing reactors, one of which is marked by numeral 21, two melting furnaces marked A and B, and conveyors that feed hot iron/carbon intermediate made in the metalizing reactors to the two melting furnaces.

In describing the plant in more detail, the Applicant will describe only battery 20(*a*) and furnace A, since the two batteries and the two furnaces are identical.

Beneath each battery, two conveyors, marked by numerals 22(*a*) and 23(*a*), are disposed, with conveyor 22(*a*) being fixed, and conveyor 23(*a*) is adapted to travel as a shuttle conveyor. Shuttle conveyor 23(*a*) is adapted to travel not only to furnace A, but also all the way to the end of furnace B, in order to provide redundancy. Furnace A possesses three identical feed openings, marked by numeral 24, equally spaced along the length of both furnaces to enable shuttle conveyor 23(*a*) to distribute hot iron/carbon intermediate along the length of furnace A as well as furnace B. At the head of shuttle conveyor 23(*a*), a dunker, marked by numeral 25, is disposed to immerse into the molten bath, iron/carbon intermediate that is fed into furnace A or furnace B. It is to be noted that shuttle conveyor 23(*b*) can service both furnace A and furnace B.

Figure 2:
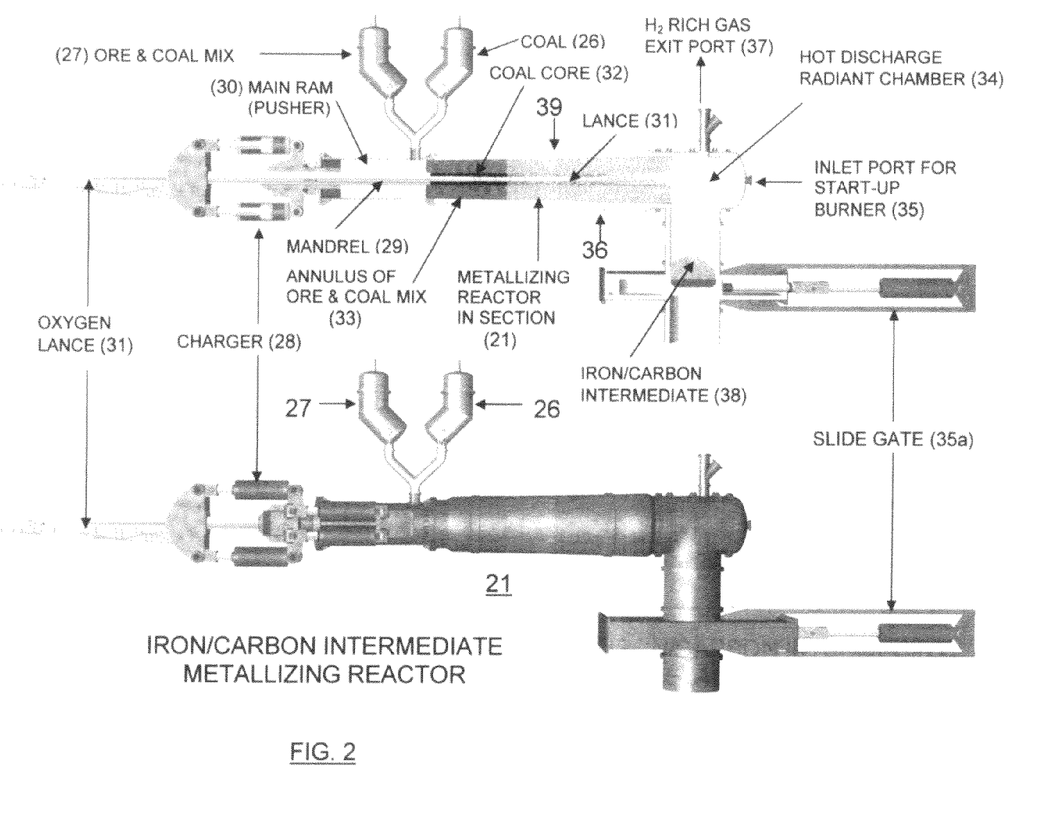
FIG. 2 represents the metallizing reactor in perspective and in section.
Figure 2A:
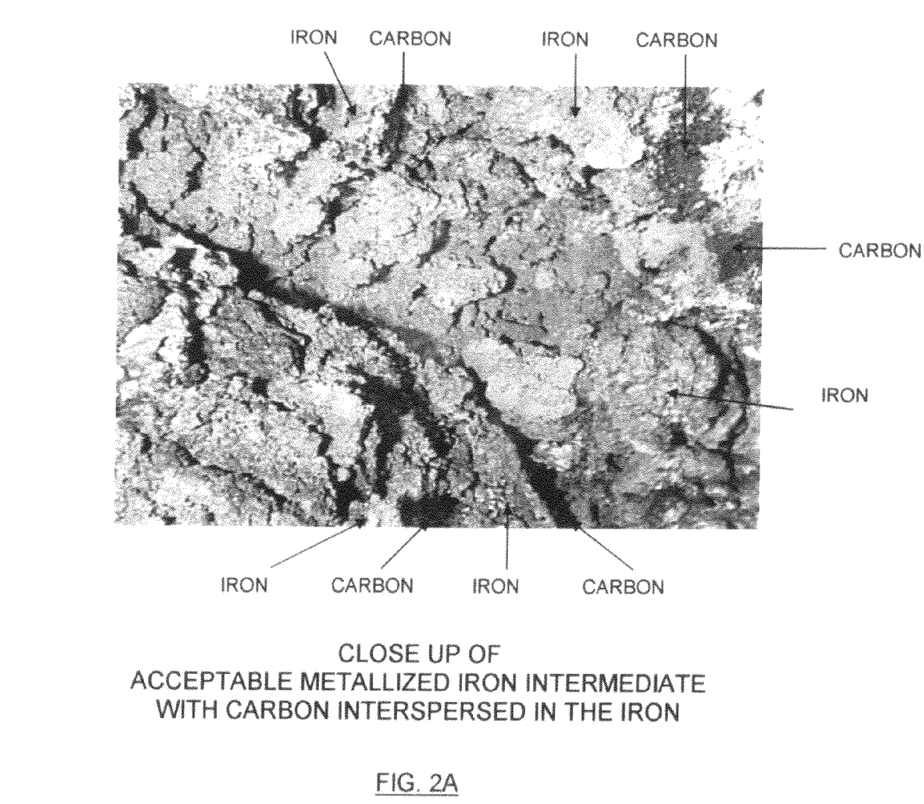
FIG. 2A shows the actual iron/carbon intermediate with the carbon being physically imbedded in the metallized iron.

Referring to FIG. 2, it illustrates iron/carbon metallizer reactor 21 in perspective and in section, with feed-hopper 26 adapted to feed coal and feed-hopper 27 to feed a mix of ore and coal. Numeral 28 represents the charger, which is made-up of mandrel 29 and main ram (pusher) 30, with lance 31 being disposed through the center of mandrel 29 with penetration at the charging end of reactor 21. The coal core is the dark colored material denoted by numeral 32 through which lance 31 passes and annulus 33, which is made-up of an iron-and-coal mix, fully surrounds coal core 32. The discharge of reactor 21, which consists of a hot radiant chamber, is marked by numeral 34; it possesses an inlet port 35 for mounting a start-up burner. A slide gate provided downstream discharge chamber 34, marked by numeral 35(*a*), serves as a control feeding apparatus to service a surge containment vessel from metalizing reactor 21 into main conveyor 22(*a*) (shown in FIG. 1) at a predetermined sequence, since conveyor 22(*a*) receives iron/carbon intermediate from several metalizing reactors. It is to be noted that metalizing reactor 21 is lined with insulation and refractory material with heating flues built in the refractories to radiate heat into reactor 21 in order to provide thermal energy to heat annulus 33 bi-directionally. The heating flues are not shown, as it is commonly used in industry, and they are always encased in a steel shell marked by numeral 39. FIG. 2A represents the actual structure of the iron/carbon intermediate which clearly shows carbon which originated from coal, interspersed in iron which originated from the ore. Such intermediate is the feedstock to produce liquid iron by way of melting it. During metallization of the iron ore with coal, a hydrogen ($H_2$) rich gas is generated; this gas, which is quite valuable as an energy source, leaves through exit port 37.

Figure 3:
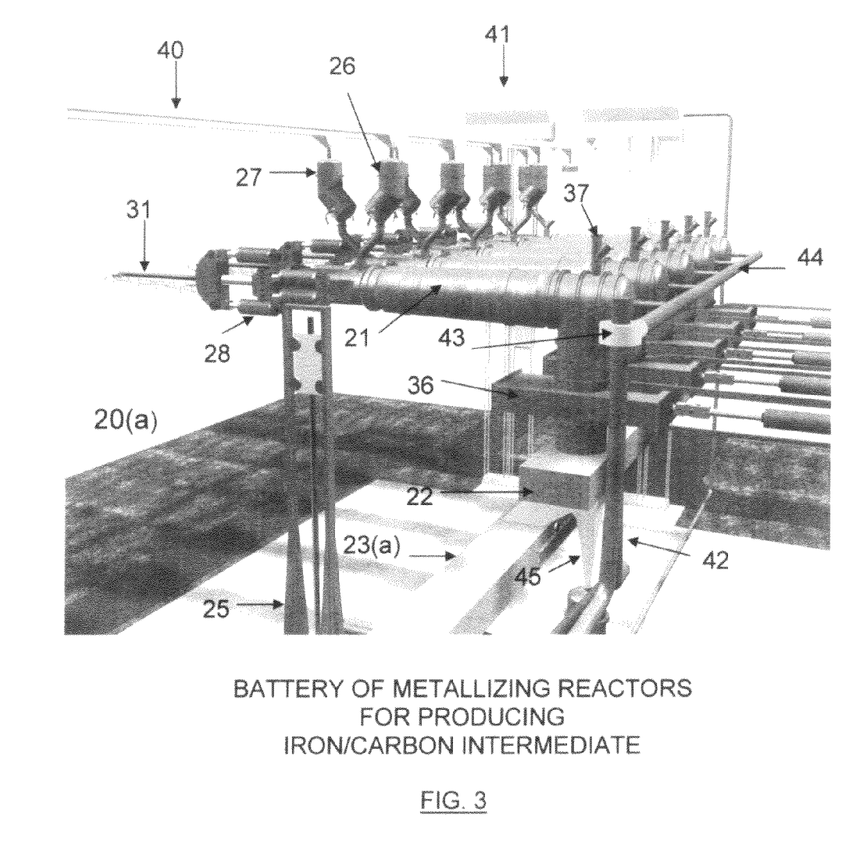
FIG. 3 illustrates in perspective a battery of metallizing reactors that produce the intermediate.

Referring to FIG. 3, it illustrates battery 20(*a*) with most of its components described in FIG. 1 and FIG. 2, except for numeral 40 which represents the distribution conveyors of feed into feed-hoppers 26 and 27. The other equipment is represented as follows: The skip hoist to deliver feed from ground level by numeral 41, the furnace exhaust suction dud by numeral 42, the exhauster by numeral 43, flue gas injection manifold by numeral 44, and sizing screen by numeral 45 which separates the screenings from the iron/carbon intermediate prior to being fed into furnace A to minimize dust emissions during the feed of the intermediate.

Figure 4:
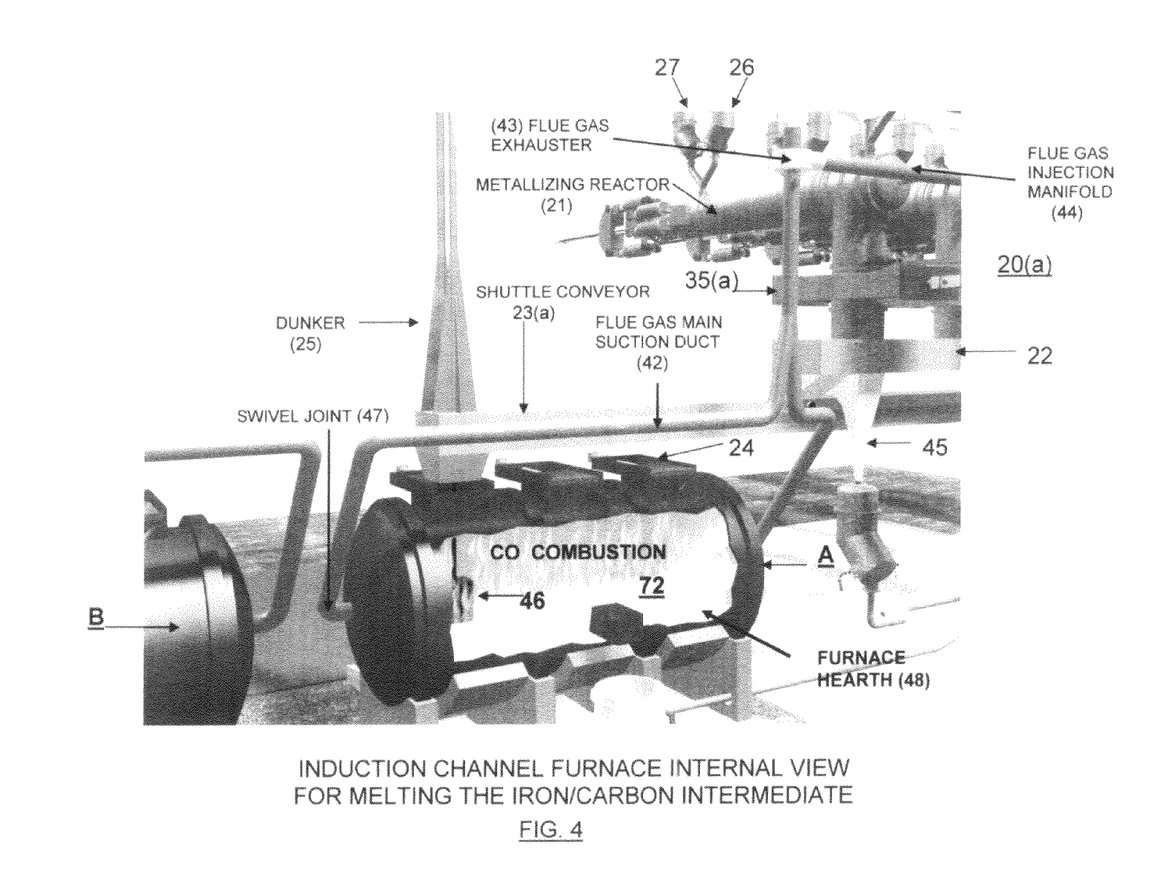
FIG. 4 is a close-up and partial view of the induction melting furnaces with the intermediate delivery system.

Referring to FIG. 4, it illustrates part of battery 20(*a*), induction channel furnace A, and part of furnace B. In addition to what was described in previous Figures, furnace A is shown with a front part missing to illustrate the internals of the furnace with a graphite immersion block marked by numeral 46 at the left side of furnace A. Other parts include the upper component of dunker 25 that forces the iron/carbon intermediate floating on top of molten iron which is immersed into molten bath 72, swivel joint 47 which permits the rotation of the furnace while still continuously extracting combustion gases from within furnace A, the furnace hearth 48, and the combustion of CO above the hearth being released from the reaction of oxygen from the iron oxides with carbon contained in the immersed iron/carbon intermediate.

Figure 5:
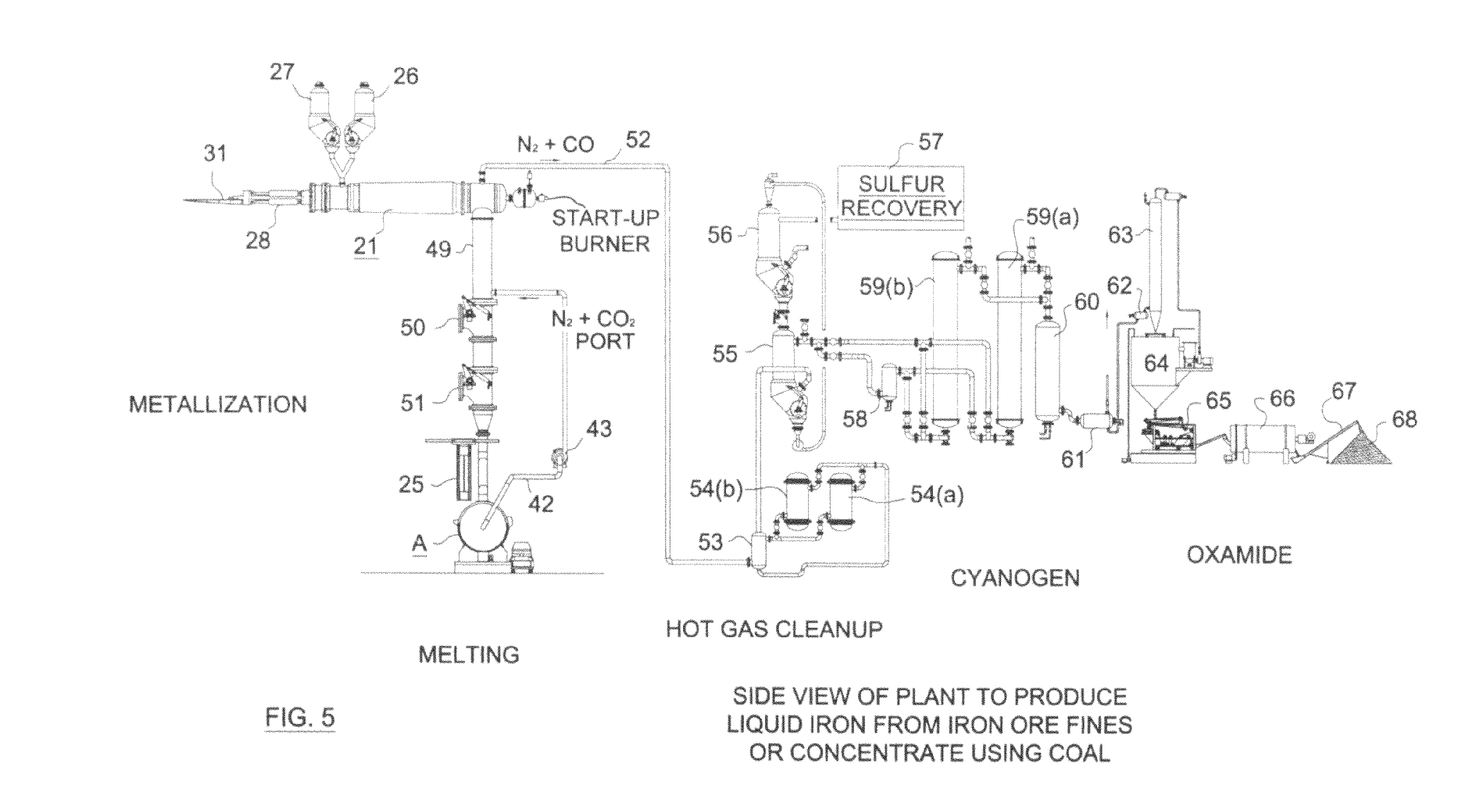
FIG. 5 illustrates a side elevation of the plant, which includes gas cleanup and the co-production of fertilizer (oxamide) from a gas containing $CO_2$.

Referring to FIG. 5, it represents a side elevation of the plant wherein conveyor 22(*a*) and conveyor 23(*a*) have been replaced by a stand pipe marked by numeral 49 followed by valves 50 and 51 controlling the feed of iron/carbon intermediate directly into induction channel furnace A and exhausting the flue gas ($N_2+CO_2$) from furnace A to the bottom of stand pipe 49. A piping system denoted by numeral 52 connects to heat exchanger 53 which feeds relatively cold gas containing mercury into cleanup bed 54(*a*) or cleanup bed 54(*b*); these two beds, which alternate in usage, contain activated carbon to extract mercury from the gas. Downstream from exchanger 53, a desulfurizer 55 forms the lower part of a hot-gas cleanup with a sorbent regenerator 56 disposed above desulfurizer 55. Two reactors 59(*a*) and 59(*b*) are disposed downstream of desulfurizer 55 to serve as converters of carbon monoxide (CO) to cyanogen, and downstream of sorbent regenerator a sulfur recovery system marked by numeral 57; it serves to recover the sulfur in elemental form, a marketable commodity. A second heat exchanger denoted by numeral 58 conditions the desulfurized gas. Reactors 59(*a*) and 59(*b*) alternate from being a producer of cyanogen to a regenerator of the catalyst. Downstream of reactors 59(*a*) and 59(*b*) a liquifier marked by numeral 60 is provided; it is followed by separator 61, and pump 62 which elevates the cyanogen to be hydrated in column 63 to form oxamide, a slow-release fertilizer. A settling tank 64 is disposed upstream of filter press 65 while drier 66 follows filter press 65, and stacker 67 transports the final product as a marketable fertilizer to storage 68.

Figure 6:
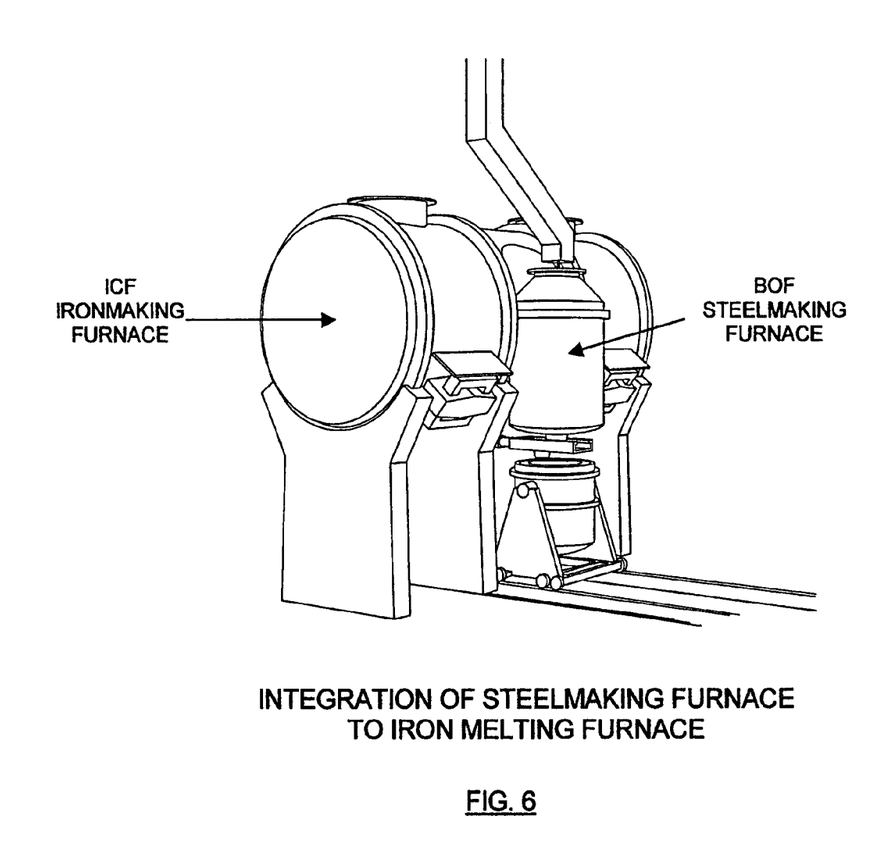
FIG. 6 illustrates the integration of a steelmaking furnace, which is commonly known as a basic oxygen furnace (BOF), to an ironmaking furnace, which is commonly known as an induction channel furnace (ICF).

FIG. 6 illustrates the integrating of steelmaking to ironmaking by means of a BOF to an ICF, both referenced in the Objective section in this disclosure; it is feasible to consolidate the following three steps in a single, low-cost, efficient, physically integrated Method consisting of:

Metallization of iron ore consisting of fines or concentrate with coal forming an intermediate;

Melting the intermediate producing liquid iron; and

Blowing the liquid iron with oxygen producing steel.

Since the method of metallization and melting has been described in detail above, FIGS. 7 to 18 will describe the steps of feeding the iron/carbon intermediate, melting it into liquid iron and producing the steel.

Figure 7:
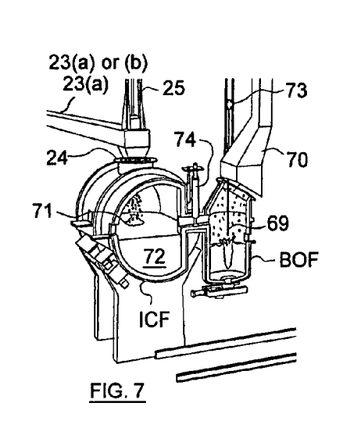
FIG. 7 through FIG. 18 show the various operating steps of producing the liquid iron and its conversion into steel, which are simultaneously carried out with the iron liquid produced in the ICF and the steel in the BOF.

FIG. 7 illustrates shuttle conveyor 23(*a*) or conveyor 23(*b*) feeding iron/carbon intermediate into the ICF with material floating on the molten bath marked by numeral 71 while oxygen is being blown within the BOF by means of a vertical lance 69 converting the iron into steel with fumes being collected in hood 70; a hoist marked by numeral 73 serves to raise and lower lance 69.

Figure 8:
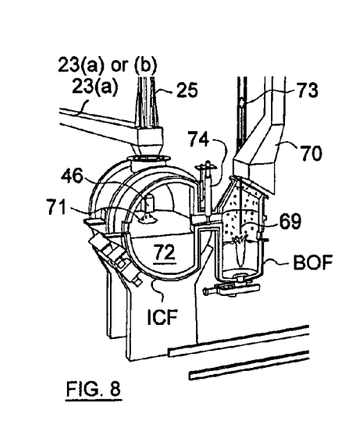
Figure 9:
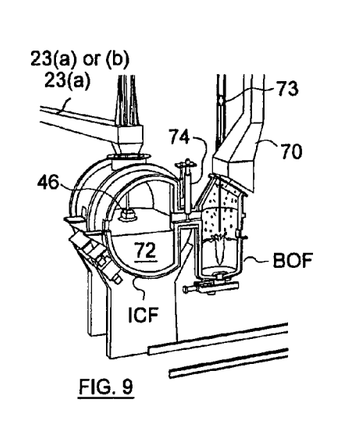

FIG. 8 is the same as FIG. 7, except for dunker 25 positioning graphitic block 46 over the intermediate which is still floating over the molten bath. FIG. 9 shows that graphitic block 46 has immersed the floating intermediate into bath 72.

Figure 10:
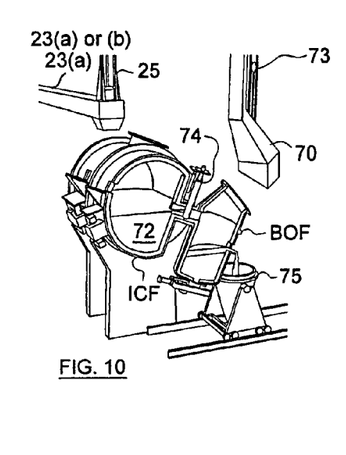
Figure 11:
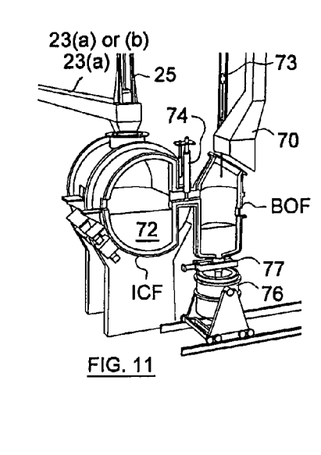

FIG. 10 illustrates the pouring of the slag from the BOF into pot 75 while using a stopper rod denoted by numeral 74 to prevent the flow of liquid iron from the ICF by virtue of the ICF being in a tilted position. FIG. 11 illustrates tapping of the steel from the bottom of the BOF into ladle 76 using slide gate 77. It is to be noted that the slagging and tapping of the BOF may be effected by other configurations.

Figure 12:
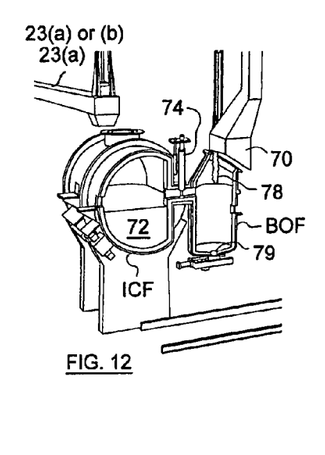
Figure 13:
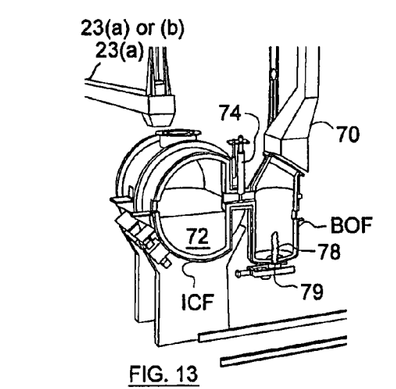
Figure 14:
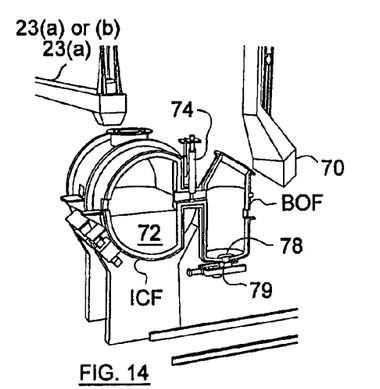

FIG. 12 illustrates the heat in the BOF has been tapped and the dropping of a tapping-hole sealing material 78 into the BOF tap hole marked by numeral 79. FIG. 13 illustrates sealing material 78 in the process of filling tap hole 79, and FIG. 14 shows the tap hole 79 to have been sealed.

Figure 15:
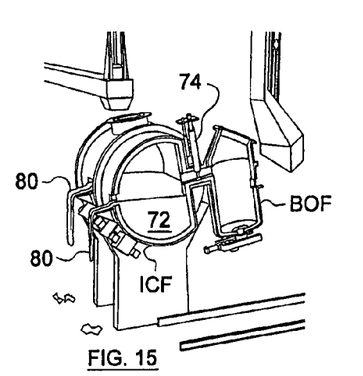
Figure 16:
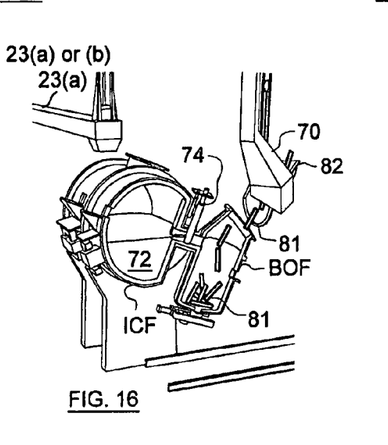
Figure 17:
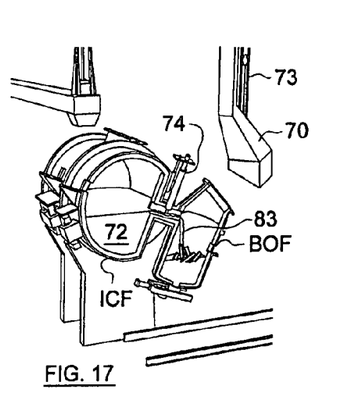
Figure 18:
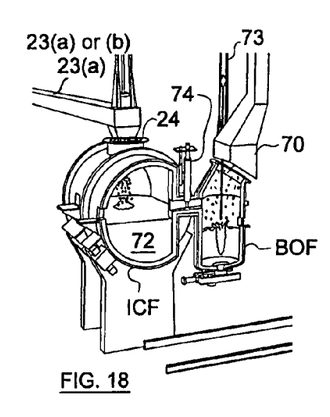

FIG. 15 illustrates the slagging of the ICF by tilting the ICF counter-clockwise, with slag produced from melting the intermediate marked by numeral 80, being poured out from the ICF. FIG. 16 illustrates the tilting of the ICF clockwise to enable the charging of the BOF with scrap, which is marked by numeral 81, by means of chute 82 with stopper rod 74 being in the down position to prevent molten iron from flowing from the ICF into the BOF during the charging of the scrap. FIG. 17 shows that while the ICF and the BOF are in the tilted position, stopper rod 74 is in the raised position allowing the liquid iron, marked by numeral 83, to flow from the ICF into the BOF, dispensing a predetermined charge of liquid iron on top of scrap 81. At this point the ICF is rotated from its tilted position to the erect position, hood 70 rotated over the mouth of the BOF, oxygen lance 73 hoist lowered into the BOF to begin converting the liquid iron into steel by blowing oxygen from lance 69 while conveyor 23(a) or (b) positioned over charging hole 24 of the ICF, proceeds the feeding of iron/carbon intermediate into the ICF to melt it while the liquid iron and the scrap are being converted into steel, as illustrated in FIG. 18 which is the same as FIG. 7, which illustrates the same functions of feeding iron/carbon intermediate by conveyor 23(a) or (b), melting it into liquid iron in the ICF to form bath 72 and converting the liquid iron and scrap into steel, while iron ore fines or concentrate undergo metallization with coal in metalizing reactor 21, shown and described in FIGS. 1 through 5, inclusive.

With respect to the application of this invention to the non-ferrous metals, variations to that which is disclosed herein, can take place; however, the intention is not to depart from the spirit of this disclosure. All in all, it is submitted, herein that the instant invention provides major improvement over conventional practice/metallurgy, which can use low-cost raw materials, and which is energy efficient and environmentally friendly, while requiring low capital investment.

We claim:

1. A method for increasing efficiency, cutting costs, and reducing polluting emissions in the process of making steel, comprising the integration of the following steps:
    metallizing iron ore fines or iron ore concentrate by utilizing a reductant to form an iron carbon intermediate in a sealed-to-the-atmosphere pressurized chamber;
    delivering said intermediate to an ironmaking furnace;
    melting said intermediate in said ironmaking furnace to produce a liquid iron; and
    converting the liquid iron into steel in a steelmaking furnace which is physically conjoined to said ironmaking furnace in such a way as to form a single, dual-purpose, integrated unit;
    wherein the ironmaking furnace is an induction channel furnace which incorporates a molten bath that releases a secondary gas during the process of melting said intermediate.

2. The method as set forth in claim 1 wherein said step of metallizing said iron ore fines or iron ore concentrate by utilizing a reductant to form an iron carbon intermediate is further characterized by said reductant being a carbonaceous material.

3. The method as set forth in claim 2 wherein said carbonaceous material is coal.

4. The method as set forth in claim 1 wherein said sealed-to-the-atmosphere chamber is configured in such a way as to contain a core of coal surrounded by an annulus composed of coal plus iron ore or iron ore concentrate.

5. The method as set forth in claim 4 wherein said core is characterized by having a bore through it to accommodate the insertion of an injection lance through said bore for the injection of a gas containing oxygen.

6. The method as set forth in claim 5 wherein said lance is inserted from the charging end of said pressurized chamber.

7. The method as set forth in claim 6 wherein said chamber is substantially horizontal.

8. The method as set forth in claim 6 wherein said lance inserted from the charging end of said pressurized chamber is further characterized by combusting said core under suppressed conditions while producing reducing gases that serve in the metallization of the iron ore fines or iron ore concentrate.

9. The method as set forth in claim 8 wherein the step of producing reducing gases during the metallization of said iron ore fines or iron ore concentrate is further characterized by producing volatile matter from the coal which, after cleanup, is utilized to produce CO.

10. The method as set forth in claim 9 wherein said CO is converted to cyanogen, and the cyanogen is hydrated to produce oxamide.

11. The method as set forth in claim 9 wherein said volatile matter is cracked and desulfurized to produce a clean synthetic gas.

12. The method as set forth in claim 11 wherein mercury is removed from said synthetic gas.

13. The method as set forth in claim 4, wherein said annulus is bidirectionally heated.

14. The method as set forth in claim 1 wherein the step of melting said intermediate in an ironmaking furnace to produce a liquid iron is further characterized by said furnace being fed with said intermediate in a controlled sequence while maintaining system pressure within said pressurized chamber.

15. The method as set forth in claim 1 wherein said ironmaking furnace comprises a roof and said secondary gas is combusted above said molten bath to cause the roof of said ironmaking furnace to radiate thermal energy to the surface of said molten bath to insure that the liquid iron as well as any slag floating on top of said molten bath remain liquid.

16. The method as set forth in claim 1 wherein said step of converting said liquid iron into steel in a steelmaking furnace is further characterized as a basic oxygen furnace.

17. The method as set forth in claim 16 wherein once some scrap has been charged into the basic oxygen furnace, a measured amount of liquid iron is poured directly from said induction channel furnace into said basic oxygen furnace to efficiently produce steel.

18. The method as set forth in claim 17 further characterized by said induction channel furnace being fed with intermediate produced from a battery of metallizing pressurized chambers and delivered to said induction channel furnace by means of conveyors.

19. The method as set forth in claim 18 wherein two induction channel furnaces are provided and equipped with duplicate conveyors to insure redundancy.

20. The method as set forth in claim 17 wherein the induction channel furnace is rotated to discharge slag, and the induction channel furnace is rotated to directly pour liquid iron into the basic oxygen furnace.

21. The method as set forth in claim 1 wherein said ironmaking furnace to produce liquid iron and steelmaking furnace to produce steel are conjoined in such a way as to operate in tandem.

22. The method as set forth in claim 1 wherein said step of converting said liquid iron into steel in a steelmaking furnace is further characterized as an electric arc furnace.

23. A method for increasing efficiency, cutting costs, and reducing polluting emissions in the process of making steel, comprising the integration of the following steps:
    metallizing iron ore fines or iron ore concentrate by utilizing a reductant to form an iron carbon intermediate in a sealed-to-the-atmosphere pressurized chamber;
    delivering said intermediate to an ironmaking furnace;
    melting said intermediate in said ironmaking furnace to produce a liquid iron; and converting the liquid iron into steel in a steelmaking furnace which is physically conjoined to said ironmaking furnace in such a way as to form a single, dual-purpose, integrated unit;
wherein said steelmaking furnace is an electric arc furnace.

* * * * *